United States Patent Office 3,032,560
Patented May 1, 1962

3,032,560
PROCESS FOR PREPARING AMYLANTHRAQUINONE
Lynn H. Dawsey, 714 W. 12th St., Tifton, Ga.
No Drawing. Filed May 29, 1959, Ser. No. 816,676
4 Claims. (Cl. 260—369)

A nonexclusive, irrevocable, royalty-free license in the invention herein described for all uses of the United States Government, with the power to grant sublicenses for such uses, is hereby granted to the Government of the United States of America.

This invention relates to a process for producing amylanthraquinone.

The amylanthraquinone produced by the process of the present invention is a newly discovered substance heretofore unknown with regard to process of synthesis or with regard to description of physical and chemical properties. It is of definite chemical composition and is a member of the class of organic substances known as alkyl-anthraquinones as represented by the formula:

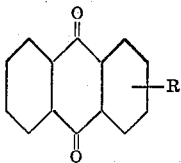

where R is an alkyl radical attached to the anthraquinone nucleus.

Several members of this general class of compounds have been recorded in the past but the total number has been limited. The following table lists the names, properties, method of preparation, and literature references for such established compounds, all of which have been shown to be crystalline substances with characteristic melting points.

| Alkylanthraquinone | Molecular | Melting Point, °C. | Preparative Method and Reference |
|---|---|---|---|
| 2-Methyl-anthraquinone | 222 | 176 | Cyclisation with oleum.[a] |
| 2-Ethyl-anthraquinone | 236 | 109 | Do.[b] |
| 2-n-Propyl-anthraquinone | 250 | 99 | Do.[c] |
| 2-iso-Propyl-anthraquinone | 250 | 45 | Do.[c,d] |
| 2-n-Butyl-anthraquinone | 264 | 90 | Do.[d,e] |
| 2-t-Butyl-anthraquinone | 264 | 104 | Do.[d] |
| 2-n-Heptyl-anthraquinone | 306 | 88 | From napthaquinone.[e] |
| 2-n-Decyl-anthraquinone | 348 | 103 | Do.[e] |

[a] Org. Synth. Coll., vol. I, 345, John Wiley & Sons, N.Y.C., 1932.
[b] PB Report 44,961, Aug. 1946, Library of Congress.
[c] Beilstein.
[d] J. Chem. Soc. 1945, 181–2.
[e] J.A.C.S. 55, 2815 (1933).

The first six listed, which include the methyl- through the butyl- derivatives, have been of economic importance while the last two have proven to be of academic interest only, due to devious and costly methods of preparation. The simpler known compounds, where the number of atoms in the alkyl group did not exceed four carbons, have been synthesized in varying yields by the action of fuming sulfuric on the corresponding 2-(4'-alkylbenzoyl)-benzoic acids. The parent substance, anthraquinone itself, has been made in 100% yield, the simplest methylanthraquinone derivative has been made in 85% yield, and the next simplest ethylanthraquinone in 75% yield, the isopropyl-derivative in 33% yield, and so on, with the difficulty of synthesis generally increasing as the number of carbon atoms in the attached alkyl group increased. Thus, while Peters and Rowe (J. Chem. Soc., 1945, 181) were successful in the preparation of certain butyl- derivatives, they obtained nothing in attempts at synthesis of the amyl-, heptyl-, octyl-, and dodecyl- derivatives, all of which would have contained more than four carbon atoms in the alkyl radical. The physical existence of these four latter named derivatives has never been proven, with the exception of the heptylanthraquinone which was recorded several decades ago as a scientific curiosity.

Hypothetical formulas and names for many additional alkylanthraquinones of more complex structure or higher molecular weight have been postulated in the prior art, but their actual existence has remained doubtful in the absence of proof, such as a record of the synthetic method employed or a description of physical and chemical properties of such hypothetical substances.

It is the primary object of the present invention to provide in fact a process for the production of amylanthraquinone having certain distinguishing chemical and physical properties.

Moreover, an object of the invention is to provide a process for the production of amylanthraquinone possessing remarkable physical properties; specifically to provide a liquid amylanthraquinone product which is readily miscible with most common organic solvents.

Another object of the invention is to provide a product of practical utility, such as for example, a product for use as the working intermediate in chemical processes for the manufacture of hydrogen peroxide.

According to this invention, amylanthraquinone may be synthesized by the action of fuming sulfuric acid upon 2-(4'-amylbenzoyl)benzoic acid, but only provided a number of special precautions are observed. The discovery of these special conditions in carrying out the cyclisation and the additional steps necessary to recover the product after cyclisation are parts of the invention, and are described as follows:

The formation of 2-amylanthraquinone may be characterized by the general equation.

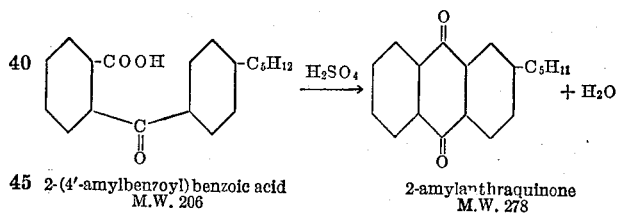

2-(4'-amylbenzoyl)benzoic acid
M.W. 206

2-amylanthraquinone
M.W. 278

The raw materials are 2-(4'-amylbenzoyl)benzoic acid and fuming sulfuric acid. Water is a byproduct of the reaction and is absorbed in the sulfuric acid reaction medium.

The reaction is of the unimolecular type in which both the starting and final substances remain in solution. The temperature coefficient for a 10° C. rise is approximately 3. Of the several factors affecting the rate and yield, by far the most important is temperature. The reaction proceeds slowly, if at all, at room temperature, becomes appreciable at 50° C., and proceeds very fast at 95° C., at which latter point sulfonation of the product may become appreciable. The periods required for 95% completion are approximately 14 hours at 65°, 5 hours at 75°, 1.5 hours at 85°, and 0.5 hour at 95° C. The preferred temperature range is 75° to 90° C.

Other factors affecting reaction rate and yield of product include purity of starting materials, oleum concentration, catalysts, agitation of the reaction mixture.

The amylbenzoylbenzoic acid material, as characterized by the formula with molecular weight 296 in the above equation, may consist of one or more of eight theoretically possible isomers, depending upon the spatial arrangement of the 5 carbon atoms in the amyl-radical attached to the benzoyl group (J.A.C.S., 60, 1476, 1938). This material should be dry and of at least 95% to 99% purity for best results, although lower grades can be employed with a consequent lowering of yield. This raw material may be crystalline or amorphous depending upon the isomer content and kind of impurities present. When crystalline, the melting point may vary from 100° to 150° C.

The oleum may be of technical grade, or better, and contain from 0 to 25% sulfur trioxide. While the reaction may be carried out with 95% to 100% $H_2SO_4$, an excess of free sulfur trioxide is preferable since the latter is a positive catalyst. When the cyclisation is started with 100% sulfuric acid containing no free sulfur trioxide, the water liberated in the reaction dilutes the medium below the 100% initial concentration which is critical; the rate of reaction then drops off sharply. Oleum strengths above 10% $SO_3$ cyclisize the amylbenzoylbenzoic acid at somewhat faster rates, but due to undesirable sulfonation of the product, use of higher concentrations of $SO_3$ generally give lower overall yields of the desired product. The preferred starting $SO_3$ concentration in the oleum is 5% to 10%, of which about 4% is consumed in combination with the water liberated during the cyclisation (cf. equation above). Presence of a small excess of $SO_3$ is desirable throughout the entire course of the reaction in order to insure completion within a reasonable period of time.

Organic impurities in the raw materials consume sulfur trioxide and reduce the speed of the main reaction, or stop it completely; likewise sulfonation, which is a side reaction, consumes the preferred slight excess of $SO_3$; these side reactions may be minimized through accurate temperature control and continuous agitation of the reaction mixture during the cyclisation period.

The reaction may be carried out in a closed, jacketed vessel equipped with slow-speed agitator, drain cock, appropriate top connections for thermometer, vent, agitator shaft, and a port for introduction of materials.

The proportion of materials used may vary from 5 to 10 parts, by weight, of oleum for each part amylbenzoylbenzoic acid taken. The preferred ratio is about 8 parts oleum to one part of the amyl acid, which on dissolving will give a solution of specific gravity of about 1.75. More than 10 parts oleum may be employed without affecting results substantially.

The oleum may be added first to the reaction vessel and heated to about 10° C. under the selected reaction temperature. The amyl acid material may be added then in the form of granules to the heated oleum with agitation, after which the temperature of the reaction mixture may be raised to the desired level and maintained there for a definite length of time. Practically speaking, the desired reaction period is the time required for consumption of about 95% of the amyl acid. In the temperature range of 80° to 90° C., with oleum of 5% $SO_3$ content, the reaction period will vary from about four hours at the lower temperature to about 70 minutes at the higher temperature; at 85° C., the period will be about 2 hours. For a particular temperature and set of operating conditions, the proper period should be predetermined experimentally. When cyclisation is nearly complete, the mixture may be cooled and run from the reaction vessel into another tank or settling vessel, also equipped with agitator, which contains a volume of cold water equal to about 3 times that of the original reaction mixture. The temperature of the diluted mixture, amounting to 4 volumes, is now maintained at about 60° C. in the settling vessel. One volume of carbon tetrachloride, or other suitable extraction solvent, may be added. The whole contents may be agitated and the mixture allowed to settle in two layers afterwards. The organic layer containing the product is separated from the aqueous phase and retained. This batch extraction is repeated two more times with additional solvent, after which the spent sulfuric acid mixture is rejected. The organic extracts are combined, washed with water, and treated with 2% sodium hydroxide solution to remove, and subsequently recover, any unreacted amyl acid. The solvent is distilled off and recovered from the combined extracts, leaving the crude, orange colored, oily product behind. The latter may consist of amylanthraquinone of better than 95% purity, and the yield may vary from 70% to 80% under optimum conditions.

The above described separation of the product from the diluted sulfuric mixture, which may have a specific gravity of about 1.2, may also be accomplished in large vessels without use of extraction solvent, such as by settling, or by a combination of operations involving both settling and solvent extraction.

The crude amylanthraquinone product may be utilized directly for a number of purposes, or it may be further purified by washing through various absorptive agents with suitable organic solvent.

The invention is illustrated by the following examples:

*Example 1*

A crude 2-(4'-amylbenzoyl)benzoic acid of about 90% purity in the form of tan colored granules melting in the range 107–112° C., and consisting of a mixture of primary, secondary, and tertiary isomers, was employed in a synthesis of the type described above. Twenty parts by weight of the granules were added with stirring to 156 parts by weight of 100% sulfuric acid held at 70° C. in a reaction vessel equipped with agitator, thermometer, vent, etc. The resulting dark red mixture was protected from moisture and slowly agitated at 75° C. for a period of 5 hours, then cooled down to room temperature. The reaction mixture, now amounting to about 100 parts by volume, was slowly run, with agitation and cooling into a settling vessel containing 300 volumes of water. The diluted mixture was agitated in the settling vessel and held at about 60° C. while 100 volumes of carbon tetrachloride were run in. The contents were mixed at the same temperature. After settling, the carbon tetrachloride layer, containing the product and some unreacted amyl acid, was drawn off into a separate holding vessel. The diluted reaction mixture was extracted successively two more times with 50 volumes additional solvent each time, followed by settling and drawing off, after which the sulfuric acid layer was rejected. The 3 carbon tetrachloride extracts were combined and returned to the original settling vessel and were washed with water until neutral. The extracts were then washed with 50 volumes of aqueous 2% sodium hydroxide solution and settled to remove the unreacted amyl acid. This sodium hydroxide wash solution was retained for later recovery of the amyl acid removed from the carbon tetrachloride solution. The carbon tetrachloride solution was dried with solid sodium carbonate, clarified by passage through a fixed bed of activated magnesia, and the solvent was evaporated leaving the crude amylanthraquinone product behind. The latter, in the amount of 10.4 parts, was an orange colored, nonvolatile, viscous oil of specific gravity 1.07 at 25 C. The uncyclisized amyl acid recovered from the alkali wash solution amounted to 4.5 parts by weight, out of the original 20 parts taken at the start of the synthesis. The amyl acid consumed was thus 15.5 parts while the yield of the crude product amounted to 71%. The cyclisation was 77% completed at the end of the 5-hour reaction period.

The next example illustrates, amongst other things, the effects of increased sulfur trioxide concentration and higher temperature upon the rate of cyclisation.

*Example 2*

A lot of the same amyl acid material was reacted under the same conditions as in Example 1 with the exceptions, however, that oleum containing 10% sulfur trioxide was substituted for 100% sulfuric acid, the reaction mixture was maintained at 85° in place of 75° C., and the reaction period was reduced from 5 hours to 1.5 hours. Under these altered conditions, the recovered amyl acid was 0.9 part, the consumed amyl acid was 19.1 parts, the product was 12.3 parts, and the cyclisation was 96% completed. The yield of the product based upon amyl acid consumed was 69%.

The next example illustrates, amongst other things, the effect of purity of raw material upon yield of the product.

*Example 3*

A crude amyl acid mixture consisting principally of secondary isomers was purified by crystallization from solutions of benzene and petroleum ether. The recrystallized material was nearly white, had a melting range of 120°–125° C., and was of better than 95% purity. This improved 2-(4'-sec.-amylbenzoyl)benzoic acid was reacted under the same conditions as those in Example 2, with the exception, however, that the reaction period was 3.0 hours. With the purified starting material and the longer reaction period, the amyl acid recovered was 0.6 part, the yield of amylanthraquinone was 13.6 parts or 75%, and the cyclisation was 97% completed. The specific gravity of the yellow, oily product was 1.13 at 25° C.

A sample of this product was hydrogenated according to the method of U.S. Pat. 2,495,229, with an uptake of 3 mols of hydrogen per mol of amylanthraquinone taken. The tetrahydro-amylanthrahydroquinone formed by hydrogenation was oxidized and a tetrahydro-amylanthraquinone of melting point 106–107° C. was recovered with a 90% overall yield.

*Example 4*

A crude 2-(4'-tert.-amylbenzoyl)benzoic acid, in the form of a light colored, free flowing powder of melting range 138–140° C., consisting principally of the tertiary isomer, was substituted in a synthesis under the same conditions as those in Example 3. The oleum contained 10% sulfur trioxide, the temperature of cyclisation was 85° C., and the reaction period was 3 hours. From 20 parts of starting material, 19.1 parts reacted, 0.9 part was recovered unchanged, and 13.4 parts of amylanthraquinone product were obtained in a 75% yield. The cyclisation was 95% completed. This product was a viscous, yellow oil of specific gravity 1.14 at 25° C.

A sample of this product was hydrogenated according to the method of U.S. Pat. 2,495,229, with an uptake of 3 mols of hydrogen per mol of product taken. The tetrahydro-amylanthrahydroquinone formed by hydrogenation was oxidized and a tetrahydro-amylanthraquinone of melting point 121–122° C. was obtained in high yield after one recrystallization from methyl alcohol.

Physically described, the product of the invention is a thermally stable, nonvolatile, pale-yellow substance of consistency about like that of castor oil when liquid, with a specific gravity ranging between 1.07 and 1.14, which sets to a glassy solid upon cooling, and which is insoluble in water but readily soluble in most of the common organic solvents. The yellow product is not soluble in all proportions with methanol or ethylene glycol, but is much more soluble in ethanol, propanol, etc.; hydrocarbons like mineral oil, kerosene, gasoline, and petroleum ether mix readily; likewise, organic acids, esters, ethers, ketones, amines, and most plasticizers mix easily. The product is completely soluble in concentrated sulfuric acid from which it may be recovered upon dilution with water. It exhibits a broad range of mutual solubility with numerous and diverse solvents, hardly to be expected from a prior knowledge of the properties of other alkylanthraquinones which are solids and relatively insoluble.

Perhaps the most outstanding physical distinction for amylanthraquinone is that certain forms may exist as a liquid at ordinary temperatures. Alkylanthraquinones known heretofore have been crystalline solids of considerably higher specific gravity than that shown by the product of this invention.

Chemically speaking, the product of the invention is stable toward oxidizing agents, but changed by reducing agents to the anthrahydroquinone. Upon hydrogenation with active catalyst at elevated temperature, amylanthraquinone can be further reduced to tetrahydro-amylanthrahydroquinone as illustrated in Examples 3 and 4 above. Isolation and purification of the product from organic solutions can be accomplished by vatting with excess sodium dithionite and alkali, filtering off the red aqueous solution to remove foreign matter, and blowing with air. Treatment of amylanthraquinone with oleum at excessive temperatures leads to sulfonation.

When synthesizing the product on a commercial scale, it is obvious that mixtures of the amylanthraquinones can generally be made more economically than the pure individual isomers. Either the purified or the crude product may be utilized directly for most purposes in the production of other chemicals, both organic and inorganic. It is also obvious that the invention may be employed in the form of organic solutions with other solvents, especially when the principal or active constituent of such solutions is amylanthraquinone.

The product of this invention is amylanthraquinone, of the empirical formula $C_{19}H_{18}O_2$ and molecular weight of approximately 278. It may consist of one or more of eight isomers, depending upon the spatial arrangement of the 5 carbon atoms in the amyl- radical attached to the anthraquinone nucleus. The synthetic method disclosed above is equally applicable in the preparation of these individual isomers or mixtures thereof from the corresponding 2-(4'-amylbenzoyl)benzoic acids.

From the foregoing it will be seen that this invention provides a new product, a method for synthesis, and a description of distinctive properties.

What is claimed is:

1. The process of producing 2-amylanthraquinone which comprises forming an admixture of oleum of from about 5% to 10% sulfur trioxide content and 2-(4'-amylbenzoyl) benzoic acid in which the ratio of the oleum to said benzoic acid is at least as great as 5 to 1, heating said admixture at a temperature of from about 65° C. to 95° C. for from about one-half hour to 14 hours to bring about cyclisation of said benzoic acid with the formation of 2-amylanthraquinone, diluting the reaction mixture with water to separate the 2-amylanthraquinone therefrom, and recovering the separated 2-amylanthraquinone.

2. The process of claim 1 in which the 2-amylanthraquinone is recovered by extraction with an organic solvent.

3. The process of claim 2 in which the organic solvent is carbon tetrachloride, and the carbon tetrachloride extraction is washed with water and then treated with sodium hydroxide solution to remove unreacted 2-(4'-amylbenzoyl) benzoic acid.

4. The process of claim 1 in which the reaction mixture, after being diluted with water, is permitted to stand until it has separated into two layers, one of which contains 2-amylanthraquinone, and which includes separating said layer from the other layer.

References Cited in the file of this patent

UNITED STATES PATENTS 2,657,980  Sprauer _____ Nov. 3, 1953

OTHER REFERENCES

Peters et al.: Jour. Chem. Soc. (London), (1945), pages 181–182.

FIAT Final Report No. 917, Manufacture of 2-ethylanthraquinone at the I. G. Farbenindustrie Plant in Ludwigshafen.

UNITED STATES PATENT OFFICE
CERTIFICATE OF CORRECTION

Patent No. 3,032,560                      May 1, 1962

Lynn H. Dawsey

It is hereby certified that error appears in the above numbered patent requiring correction and that the said Letters Patent should read as corrected below.

Column 1, in the table, heading to the second column, under "Molecular" insert -- Weight --; column 2, line 39 to 44, the left-hand portion of the equation should appear as shown below instead of as in the patent:

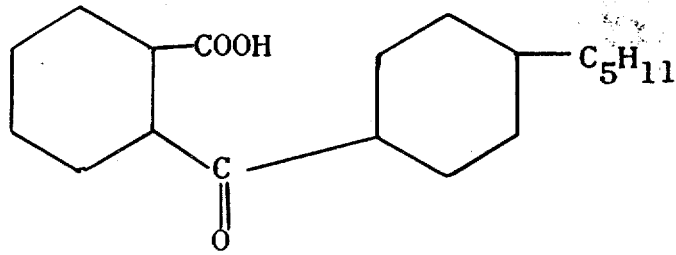

same column, line 46, for "206" read -- 296 --.

Signed and sealed this 28th day of August 1962.

(SEAL)
Attest:

ESTON G. JOHNSON                      DAVID L. LADD
Attesting Officer                  Commissioner of Patents